United States Patent [19]

Ando

[11] Patent Number: 4,480,804
[45] Date of Patent: Nov. 6, 1984

[54] WEBBING LOCK DEVICE

[75] Inventor: Takayuki Ando, Okazaki, Japan

[73] Assignee: Kabushiki Kaisha Tokai-Rika-Denki-Seisakusho, Japan

[21] Appl. No.: 348,182

[22] Filed: Feb. 12, 1982

[30] Foreign Application Priority Data

Mar. 30, 1981 [JP] Japan .............................. 56-45040[U]

[51] Int. Cl.³ ...................... A62B 35/02; B65H 75/48
[52] U.S. Cl. .................................. 242/107.2; 280/806
[58] Field of Search ..................... 242/107.2; 280/806–808; 297/478, 479, 480, 482

[56] References Cited

U.S. PATENT DOCUMENTS 3,248,148  4/1966  Board et al. ................. 242/107.2 X
4,120,466 10/1978  Adomeit ........................... 242/107.2
4,206,886  6/1980  Yoshitsugu et al. ............. 242/107.2
4,241,886 12/1980  Maekawa ......................... 242/107.2

Primary Examiner—John M. Jillions
Attorney, Agent, or Firm—Parkhurst & Oliff

[57] ABSTRACT

A webbing lock device used in a seatbelt system for restraining an occupant in the event of an emergency situation of a vehicle, wherein a pair of clamping means are adapted to clamp the intermediate portion of an occupant restraining webbing in the event of an emergency situation of the vehicle to thereby bring the occupant into a webbing-restrained state.

Particularly, a portion of the webbing closer to an occupant restraining portion of the webbing than the clamping means is flexed by a non-clamping support portion, whereby a tension generated in the clamped portion by the clamping means is attenuated, thus enabling to make the clamping lock reliable.

8 Claims, 3 Drawing Figures

WEBBING LOCK DEVICE

BACKGROUND OF THE INVENTION

1. Field of the Invention

This invention relates to webbing lock devices each used in a seatbelt system for protecting an occupant in the event of an emergency situation of a vehicle by locking an occupant restraining webbing, and particularly to a webbing lock device for directly clamping the intermediate portion of the webbing to lock the webbing, thereby bringing the occupant into a restrained state.

2. Description of the Prior Art

Heretofore, there has been proposed a webbing lock device for bringing an occupant into a webbing-restrained state by directly clamping the intermediate portion of an occupant restraining webbing of a seatbelt system in the event of an emergency situation of a vehicle. The webbing lock device of the type described is adapted to actuate a pair of clamp members by a tension generated in the webbing in the event of an emergency situation of the vehicle to thereby directly clamp the intermediate portion of the webbing. By this arrangement, the webbing lock device of the type described is advantageous in that no high tension acts on the webbing wound in layers into a takeup shaft, and moreover, the condition of loosely wound-up webbing is prevented from occurring, which would otherwise allow the portion of the webbing wound in layers to be greatly extended out, thereby improving an occupant restraining performance.

However, in the webbing lock device of this type, facing surfaces of the pair of clamp members are formed into corrugated shapes so as to increase frictional forces between the webbing and these facing surfaces. More specifically, in order to lock the webbing from its side of the takeup shaft to its side of the occupant restraining portion under a uniform clamping force between the corrugated shapes complementary to each other which are formed on the facing surfaces of the pair of clamp members, it is essential to provide the corrugated shapes with considerably high accuracy. Additionally, there is a possibility that errors in dimensions during assembling lead to the lack of a uniform clamping force during locking, thus causing a variability in locking performance.

SUMMARY OF THE INVENTION

The present invention has been developed to obviate the above-described disadvantages of the prior art and has as its object the provision of a webbing lock device wherein necessity for producing the clamping members with considerably high accuracy is eliminated, production and assembling are easily performed and a state of reliable and uniform locking is obtainable.

In the webbing lock device according to the present invention, there are provided a planar clamping section for clamping the intermediate portion of the webbing in the direction of its thickness and a non-clamping curved surface section facing a portion of the webbing closer to the occupant restraining portion than the planar clamping section for flexing the webbing to attenuate its tension, whereby the tension in the webbing is attenuated by the non-clamping curved surface section, so that the intermediate portion of the webbing subjected to the tension, which has been attenuated, can be reliably locked by the planar clamping section.

Description will hereunder be given of the embodiments of the present invention with reference to the drawings.

DESCRIPTION OF THE PREFERRED EMBODIMENTS

Figure 1:
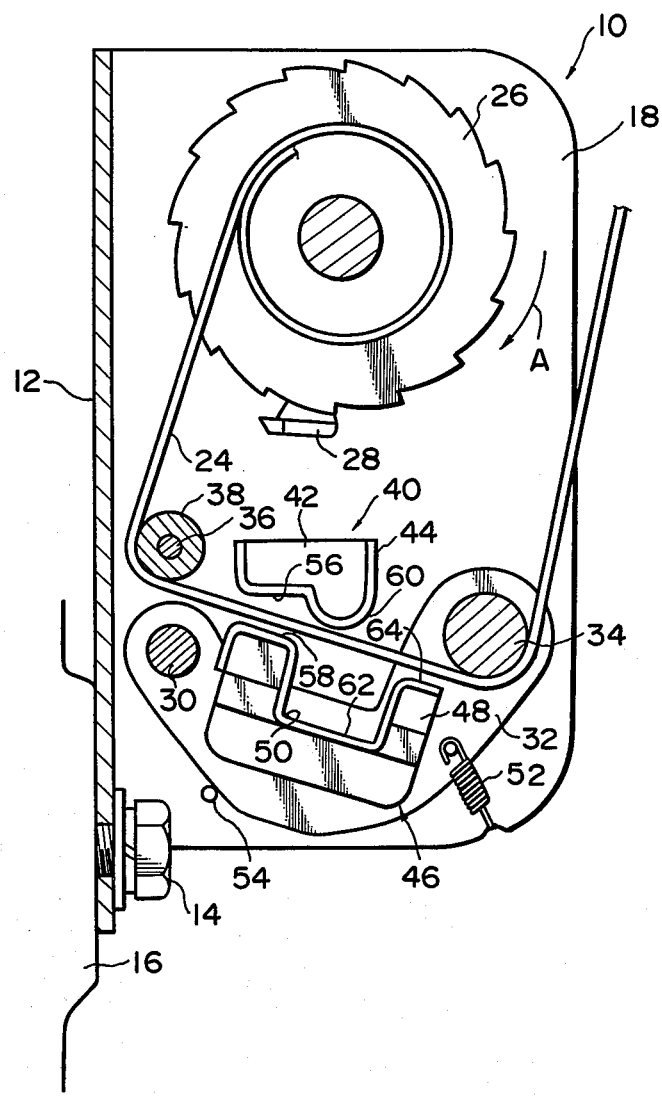
FIG. 1 is a sectional view showing the state of the webbing lock device according to the present invention during normal running condition of the vehicle.

FIG. 1 shows a webbing (web) retractor 10 having assembled therein the webbing lock (web locking) device according to the present invention. In this webbing retractor 10, a frame 12 is solidly secured to a vehicle body by means of a mounting bolt 14.

This frame 12 is provided at opposite sides thereof with a pair of leg plates 18 extending in parallel to each other (However, in FIG. 1, only one of the leg plates 18 is shown, with the other being omitted). Journalled on these leg plates 18 is a takeup shaft 22, onto which is wound in layers one end of an occupant restraining webbing 24. This takeup shaft 22 is biased by a biasing force of a spiral spring, not shown, in a winding direction of the webbing 24 (a direction indicated by an arrow A in FIG. 1), and the other end portion, not shown, of the webbing 24 is withdrawn to the outside of the retractor 10 and led to the occupant restraining portion.

Solidly secured to the takeup shaft 22 are a pair of ratchet wheels 26, which are rotatable with the takeup shaft 22 and opposed to a pawl 28 tiltably supported on the parallel leg plates 18. This pawl 28 is adapted to be actuated by an acceleration sensor, not shown, constituted by a pendulum or the like, to be meshed with the ratchet wheels 26, thereby enabling to prevent the webbing unwinding rotation of the ratchet wheels 26 and the takeup shaft 22 (in a direction opposite to the direction indicated by the arrow A).

Journalled on the lower portions of the parallel leg plates 18 is a support shaft 30 for pivotally supporting thereon ends of a pair of arms 32 (However, in FIG. 1, only one of the arms 32 is shown, with the other being omitted).

Journalled on the other ends of these arms 32 is a roller 34, on which the intermediate portion of the webbing 24 is guided.

A portion of the webbing between this roller 34 and the takeup shaft 22 is guided by a roller 38 journalled on the leg plates 18 by means of a pin 36.

A stationary clamp member 40 is affixed to the leg plates 18 at one side of a portion of the webbing 24 between the rollers 34 and 38, and in opposed relation to the arms 32. This stationary clamp member 40 comprises a base plate 42 and a lock plate 44 affixed to the outer periphery of the base plate 42 and opposed to the intermediate portion of the webbing, and longitudinally opposite ends of the base plate 42 are solidly secured to the leg plates 18.

A movable clamp member 46 is provided at the other side of the portion of the webbing 24 between the rollers 34 and 38, and in opposed relation to this stationary clamp member 40.

This movable clamp member 46 comprises a base plate 48 affixed to the arms 32 and a lock plate 50 solidly secured to this base plate 48 and opposed to the webbing 24.

As shown in FIG. 1, during normal running condition of the vehicle, the stationary clamp member 40 and the movable clamp member 46 form a suitable interval therebetween to allow the webbing 24 to freely pass through the interval. A tension coil spring 52 is stretched between the arms 32 and the leg plates 18, whereby the arms 32 are biased in the clockwise direction in FIG. 1 and abutted against and stopped at a stopper 54 mounted to the leg plates 18.

Figure 2:
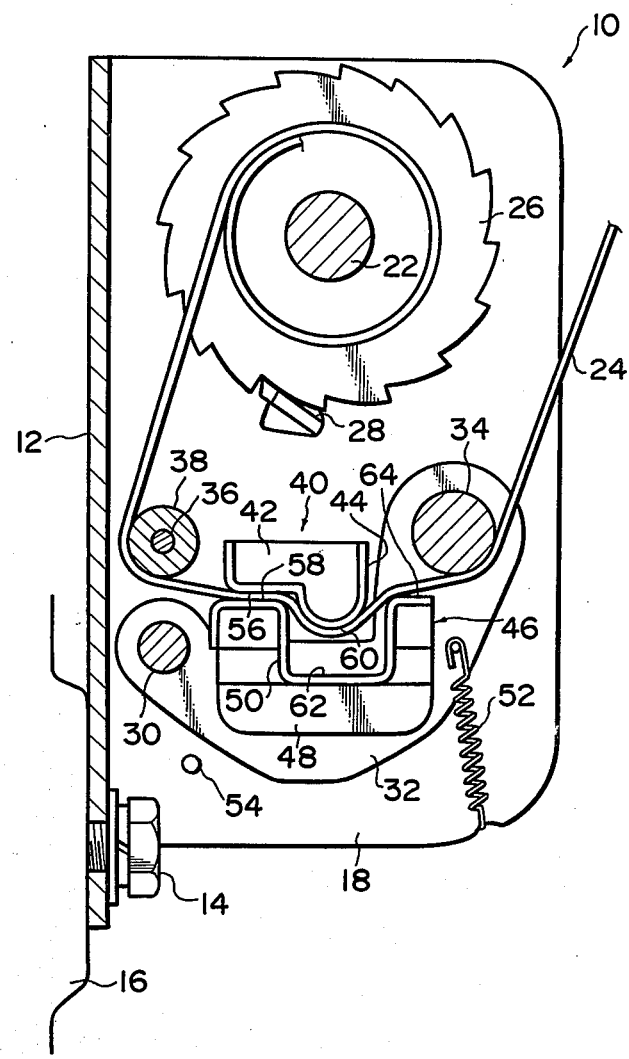
FIG. 2 is a view illustrating the webbing lock device shown in FIG. 1 in an actuated position.

However, if a tension beyond a predetermined value generated in the webbing is imparted to the arms 32 via the roller 34, then the arms 32 rotate in the counterclockwise direction in FIG. 1 against the biasing forces of the tension coil springs 52, whereby the movable clamp member 46 approaches the stationary clamp member 40 to thereby clamp the intermediate portion of the webbing 24 therebetween as shown in FIG. 2.

Detailed description will now be given of the forms of the stationary clamp member 40 and the movable clamp member 46. The stationary clamp member 40 and the movable clamp member 46 are provided thereon with planar clamping sections 56 and 58, respectively. As shown in FIG. 2, in the event of an emergency situation of the vehicle, these planar clamping sections 56 and 58 are adapted to clamp the intermediate portion of the webbing 24 in the direction of its thickness to thereby prevent the webbing from moving in the longitudinal direction thereof.

The planar clamping section 56 is attachedly provided thereon with a convexedly curved surface 60 in the longitudinal direction of the webbing and at the side of the occupant restraining portion. This convexedly curved surface 60 is opposed to a recess 62 formed in the movable clamp member 46. Furthermore, the movable clamp member 46 is provided with a projection 64 at a position closer to the occupant restraining portion of the webbing than the recess 62, whereby, in the movable clamp member 46, the planar clamping section 58, the recess 62 and the projection 64 form substantially a U shape, so that the recess 62 can receive the convexedly curved surface 60. As a result, the webbing lock device according to the present embodiment is constructed such that, in the event of an emergency situation of the vehicle, as shown in FIG. 2, a portion of the webbing between the roller 34 and the planar clamping section 56 is flexed by the convexedly curved surface 60 and the projection 64, but is not clamped thereby, so that the tension of the webbing 24 can be attenuated due to frictional forces generated between the convexedly curved surface 60 and the webbing 24 and between the projection 64 and the webbing 24.

Description will hereunder be given of action of this embodiment. The occupant unwinds the webbing 24 out of the takeup shaft 22 against the wind-up biasing force of the takeup shaft 22, whereby the end portion, not shown, of the webbing 24 can be fastened about the occupant.

Now, during normal running condition of the vehicle, the occupant can unwind the webbing 24 of a required length out of the takeup shaft 22 so as to desirably change his driving posture.

Next, when the vehicle is in an emergency situation such as a collision, the pawl 28 is meshed with the ratchet wheels 26 through the agency of the acceleration sensor, not shown, to thereby abruptly stop the webbing unwinding rotation of the takeup shaft 22.

On the other hand, the webbing 24, which has been subjected to an inertial force of collision of the occupant, generates a high tension in itself, whereby this tension is imparted to the roller 34, so that the arms 32 rotate in the counterclockwise direction in FIG. 1 to be led to the state shown in FIG. 2. In the state shown in FIG. 2, the planar clamping section 58 of the movable clamp member 46 approaches the planar clamping section 56 of the stationary clamp member 40, to thereby clamp the intermediate portion of the webbing 24 in the direction of its thickness. Additionally, the projection 64 of the movable clamp member 46 and the convexedly curved surface 60 of the stationary clamp member 40 flex the webbing 24 therebetween, so that the tension generated in the intermediate portion of the webbing 24 can be attenuated by a frictional force generated between the convexedly curved surface 60 and the projection 64. Since the webbing 24 having the tension, which has been attenuated, is clamped by the planar clamping sections 56 and 58, the webbing 24 is reliably locked between these planar clamping sections 56 and 58, so that the webbing 24 can be prevented from moving in the longitudinal direction thereof. Additionally, the tension has been attenuated to a certain extent in the portion of the webbing 24 prior to the planar clamping sections 56 and 58 as described above, and hence, even if a high clamping force in the direction of the thickness of the webbing is applied to the webbing, a variation in the tension of the webbing remains to a relatively low extent, so that damages to the webbing can be avoided.

As described above, the webbing is reliably locked between the planar clamping sections 56 and 58, whereby any high tension is not applied to the portion of the webbing between the planar clamping sections 56, 58 and the takeup shaft 22 with any loosely wound webbing thereon, so that the occupant fastened thereabout with the end portion, not shown, of the webbing is reliably restrained, thereby ensuring the safety of the occupant.

Figure 3:
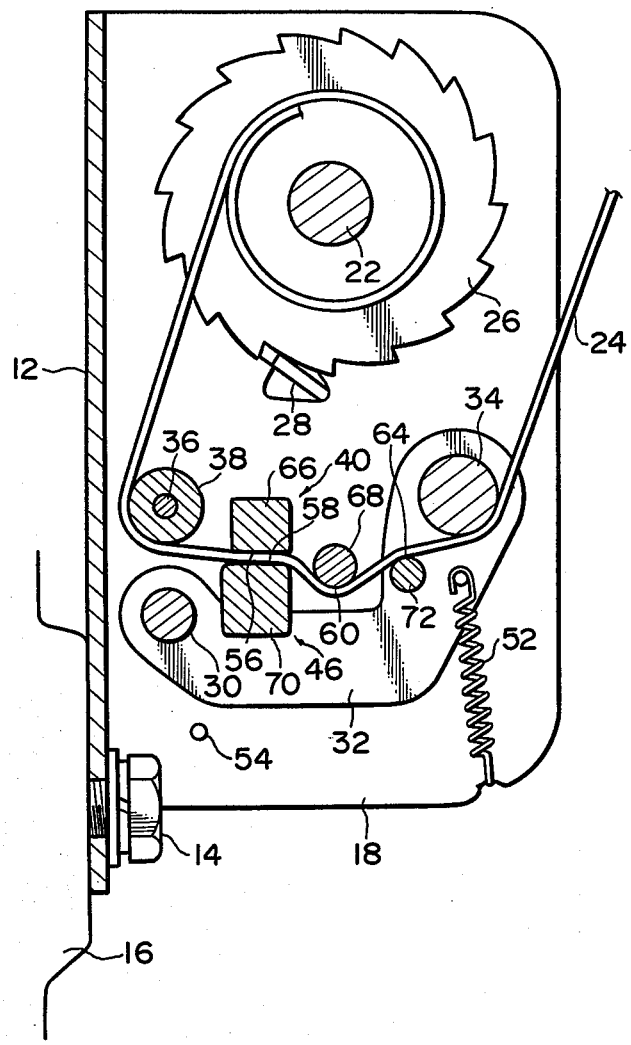
FIG. 3 is a sectional view showing the webbing lock device comprising a second embodiment of the present invention in an actuated position.

Next, in FIG. 3, there is shown a second embodiment of the present invention, in which the stationary clamp member 40 in the preceding embodiment is replaced by a rod member 66 being rectangular in cross section and a pin 68. Both the rod member 66 and the pin 68 are solidly secured at longitudinally opposite end portions thereof to the leg plates 18, and the outer surfaces of the rod member 66 and the pin 68 form the planar clamping section 56 and the convexedly curved surface 60, respectively.

Additionally, a rod member 70 being rectangular in cross section and a pin 72 are affixed to the arms 32, the outer surface of the rod member 70 forms the planar clamping section 58, the outer surface of the pin 72 forms the projection 64, and a gap between the rod member 70 and the pin 72 substantially constitutes the recess 62 in the preceding embodiment.

As a consequence, in this embodiment, the mere provision of both the rod members being simplified in construction and the pins forms the configuration of the stationary and movable clamp members, so that the advantages similar to the preceding embodiment can be offered.

As has been described hereinabove, the webbing lock device according to the present invention can offer the advantages that the planar clamping section and the non-clamping curved surface are provided as the clamp members, whereby the production is easily performed, the tension in the webbing can be reliably attenuated without requiring the work and assembling with considerably high accuracy, and the portion of the webbing, in which the tension has been attenuated, is clamped so as to reliably prevent the webbing from moving in the longitudinal direction thereof, so that the occupant restraining performance can be improved.

What is claimed is:

1. A web locking device for use in a seatbelt system for restraining an occupant with a web to protect the occupant in the event of a vehicle emergency, comprising:
   a takeup shaft means for receiving one end portion of a web which has an occupant restraining portion;
   a support frame coupled to support said takeup shaft means;
   clamping means for clamping and locking an intermediate portion of the web between said one end portion and said occupant restraining portion in the direction of thickness of the web, said clamping means including a stationary clamp member solidly secured to said support frame adjacent said intermediate portion of the web and forming a first flat surface and a movable clamp member forming a second flat surface and movably coupled adjacent the intermediate portion of said web in opposed relation to said first flat surface, said movable clamp member being constructed and arranged to move towards said stationary clamp member in a vehicle emergency to clamp said web between said flat surfaces and prevent the web from moving to provide occupant restraint by said restraining portion;
   a non-clamping support means positioned adjacent said web between the intermediate portion and the occupant restraining portion of the web for flexing the web to attenuate tension in the web such that tension in the intermediate portion of the web clamped by said clamping means is attenuated to improve the reliability of the web locking by the clamping means, said non-clamping support means including a first portion coupled to said stationary clamp member to form a convex surface and a second portion coupled to said movable clamp member to form a projection and recess adjacent said projection for receiving said convex surface upon movement of said movable clamp member.

2. The web locking device of claim 1 further comprising means response to an increase in tension in the web to move said movable clamp member for clamping said web.

3. The web locking device of claim 1 wherein said movable clamp member is journaled on said support frame for movement between a clamping and non-clamping position.

4. The web locking device of claim 3 wherein a portion of the web is guided by a portion of said movable clamp member and causes said movable clamp member to rotate when the web is subjected to tension.

5. In a web locking device for use in locking an occupant restraining web and having means for receiving one end of said occupant restraining web and means for clamping said web at an intermediate portion to prevent web movement, the improvement in said web locking device comprising:
   means for engaging said web at a position between said intermediate portion of said web and an occupant restraining portion of said web to attenuate tension in said intermediate portion, said means for engaging comprising a first portion for engaging said web and means responsive to web movement for causing said web to engage said first portion.

6. The system of claim 5 wherein said first portion is a surface which engages said web to produce frictional forces between said surface and said web to reduce tension in said intermediate portion.

7. The system of claim 5 wherein said means for clamping comprises a first stationary member and a second movable member and wherein said first portion is coupled to said stationary member and wherein said means responsive to web movement is coupled to cause said web to engage said first portion and cause movement of said movable member to clamp said web between said movable and stationary members.

8. The system of claim 5 wherein said first portion comprises a plurality of members coupled to engage said web in response to web movement.

* * * * *